(12) United States Patent
Bizouard et al.

(10) Patent No.: US 11,549,186 B2
(45) Date of Patent: Jan. 10, 2023

(54) ELECTROCHEMICAL PROCESS FOR THE PRODUCTION OF PRESSURIZED GASEOUS HYDROGEN BY ELECTROLYSIS THEN BY ELECTROCHEMICAL CONVERSION

(71) Applicant: ERGOSUP, Malataverne (FR)

(72) Inventors: Vincent Bizouard, Malataverne (FR);
Elisa Grindler, Malataverne (FR);
Jocelyn Polet, Malataverne (FR)

(73) Assignee: ERGOSUP, Malataverne (FR)

( * ) Notice: Subject to any disclaimer, the term of this patent is extended or adjusted under 35 U.S.C. 154(b) by 4 days.

(21) Appl. No.: 17/041,482

(22) PCT Filed: Apr. 3, 2019

(86) PCT No.: PCT/FR2019/050775
§ 371 (c)(1),
(2) Date: Sep. 25, 2020

(87) PCT Pub. No.: WO2019/193283
PCT Pub. Date: Oct. 10, 2019

(65) Prior Publication Data
US 2021/0079536 A1 Mar. 18, 2021

(30) Foreign Application Priority Data
Apr. 3, 2018 (FR) ...................... 18 52886

(51) Int. Cl.
*C25B 1/04* (2021.01)
*C25B 15/08* (2006.01)
*C25B 9/70* (2021.01)

(52) U.S. Cl.
CPC ................ *C25B 1/04* (2013.01); *C25B 15/08* (2013.01); *C25B 9/70* (2021.01)

(58) Field of Classification Search
CPC ................ C25B 1/02; C25B 1/04; C25B 9/05
See application file for complete search history.

(56) References Cited

U.S. PATENT DOCUMENTS

| 4,758,322 A | 7/1988 | Sioli |
| 6,153,083 A | 11/2000 | Hofmann et al. |

(Continued)

FOREIGN PATENT DOCUMENTS

| CN | 105734600 | 7/2016 |
| DE | 9115337 | 5/1992 |

(Continued)

OTHER PUBLICATIONS

Machine translation of WO2015/056641 of Sugimasa et al. (Year: 2015).*

(Continued)

*Primary Examiner* — Brian W Cohen
(74) *Attorney, Agent, or Firm* — Clark & Brody LP

(57) ABSTRACT

An electrochemical process implements, in a decoupled manner, a first step of electrolysis of an electrolyte to produce gaseous oxygen in a chamber and a second step of electrochemical conversion of H+ ions into gaseous hydrogen in a chamber which contains a liquid phase and a gas phase not dissolved in the liquid phase. Gaseous hydrogen produced in the conversion step is partly present in the gaseous headspace of chamber and as bubbles in the electrolyte, and partly dissolved in the electrolyte which is saturated with hydrogen. The electrolyte has at least one redox pair (A/B) forming at least one intermediate vector enabling the decoupling of the first and second steps. The interface between the gas and liquid phases is increased during the second step to accelerate the diffusion, from liquid phase to gas phase, of the dissolved hydrogen able to supersaturate the electrolyte. Pressurized gaseous hydrogen is then collected.

26 Claims, 6 Drawing Sheets

(56) References Cited

U.S. PATENT DOCUMENTS

| | | |
|---|---|---|
| 8,617,766 B2 | 12/2013 | Bienvenu |
| 2004/0211679 A1 | 10/2004 | Wong et al. |
| 2006/0180464 A1 | 8/2006 | Griffin |
| 2012/0121998 A1* | 5/2012 | Bienvenu ............... C25B 5/00 429/422 |
| 2014/0318979 A1* | 10/2014 | Cronin ................... C25B 1/55 205/633 |
| 2017/0297913 A1 | 10/2017 | Cronin et al. |
| 2017/0306510 A1* | 10/2017 | Rothschild ............. C25B 1/55 |

FOREIGN PATENT DOCUMENTS

| | | |
|---|---|---|
| FR | 2948654 | 2/2011 |
| WO | 2009/127145 | 10/2009 |
| WO | 2013/068754 | 5/2013 |
| WO | 2013/131838 | 9/2013 |
| WO | 2015/056641 | 4/2015 |
| WO | 2016/038214 | 3/2016 |
| WO | 2017/115269 | 7/2017 |

OTHER PUBLICATIONS

Long Chen et al., "Separating hydrogen and . . . using nickel hydroxide", Nature Communications, vol. 7, No. 1, May 20, 2016 XP055556668.

Rausch et al., "Decoupled catalytic hydrogen . . . in water splitting", Science 345, 1326 (2014).

Symes et al., "Decoupling hydrogen and . . . an electron-coupled-proton buffer", Nature Chemistry, vol. 5, 2013.

* cited by examiner

ELECTROCHEMICAL PROCESS FOR THE PRODUCTION OF PRESSURIZED GASEOUS HYDROGEN BY ELECTROLYSIS THEN BY ELECTROCHEMICAL CONVERSION

TECHNICAL FIELD

The field of the invention is that of the electrochemical production of pressurized gaseous hydrogen.

In particular, the invention relates to an electrochemical process for the production of gaseous hydrogen by electrolysis followed by electrochemical conversion of $H^+$ ions into gaseous hydrogen, either by depolarization with production of electrical energy (battery), or by the catalytic route, or by electrolysis.

The invention also relates to a device for implementing such a hydrogen production process, as well as a kit comprising the device and some or all of the consumables useful in said process.

PRIOR ART—TECHNICAL PROBLEM

Hydrogen is the cleanest and most efficient fuel for generating energy, in a fuel cell as well as in an internal combustion engine.

These qualities are particularly valuable in applications using hydrogen as a fuel for transport vehicles, in which the hydrogen stored in the vehicle produces kinetic energy by means of an internal combustion engine fueled by hydrogen and/or by means of an electric motor powered by an on-board fuel cell consuming hydrogen.

Moreover, the storage of energy in the form of pressurized hydrogen is also particularly advantageous.

Hydrogen is an invisible, odorless, and non-toxic gas. Its consumption in a fuel cell produces only electrical energy and water. Similarly, its combustion also yields water and no harmful by-products.

The most economical and therefore the most widely used method for producing hydrogen is the steam reforming of natural gas.

Production of hydrogen by the electrolysis of water is much more restricted because it is much more expensive, but this technique has the advantage of being "green" if the electrical source is as well.

In this context, hydrogen appears to be the most suitable energy vector to support an energy transition, particularly to enable clean transportation as well as the storage of energy.

To achieve this, the hydrogen must be made from electricity and water: this involves the conventional processes of alkaline electrolysis or solid polymer electrolyte membrane electrolysis (Proton Exchange Membrane), or those under development such as high-temperature electrolysis.

The use of hydrogen in the context of clean transportation requires the ability to store pressurized hydrogen in tanks on board vehicles, at high pressures ranging from 200 to 700 bar.

The conventional method is to compress the gas with a mechanical compressor; this is an expensive operation and requires numerous maintenance operations.

Hydrogen refueling stations already exist for land vehicles. This hydrogen may be produced centrally and then distributed to distribution stations, or may be directly produced on site at the distribution station. On-site production is particularly attractive in terms of logistics—but it encounters the abovementioned problem of manufacturing highly pressurized hydrogen.

Moreover, from an ecological perspective, it would be interesting if this hydrogen production were carried out by electrolysis, on site as well as centrally.

It turns out, however, that currently the hydrogen pressures reached at the outlet of the electrolyzer do not exceed 80 bar.

Numerous and fruitless attempts have therefore been made to exceed this ceiling.

Some of these attempts have consisted of designing devices aimed at providing a solution to this technical problem of producing hydrogen at high pressure. Such devices are described for example in the following patents: U.S. Pat. No. 4,758,322A1, U.S. Pat. No. 6,153,083A1, DE 9115337.9 U. These various known devices have several disadvantages which arise from the necessity of having to manage not only the supply of power to the electrodes, but also complex fluidics with the inlets/outlets for liquids and gases.

These known devices encounter the limiting factor of having to simultaneously manage the two gases resulting from the electrolysis, oxygen and hydrogen, with the essential requirement of ensuring complete separation of the two gases in order to avoid an explosion.

To overcome this limitation, patent application US 2004 0211679A1 describes a method of performing electrochemical compression at the outlet of the electrolyzer, in a second device. This technical proposal has the disadvantage of making the production process more complex, and therefore more expensive.

The limitation of simultaneously managing the oxygen and hydrogen specific to the electrolysis of water was able to be eliminated in the process according to patent FR2948654B1. This process provides for an electrolysis decoupled into two steps. A metal salt (zinc, nickel, or manganese) is used in an electrolytic cell in order to decouple the water electrolysis reaction into two steps. Firstly, the process stores electricity by depositing a metal on the cathode and releasing oxygen at the anode of the electrolytic cell. Secondly, the electrolytic cell operates as a battery, allowing the dissolution of said metal and the production of hydrogen. This process is used to store electricity, and release it in the form of hydrogen.

The decoupling of the electrolysis of water is also described in the following patent applications: CN105734600A (electrolysis in basic medium), WO2013068754A1 & WO2016038214A1 (electrolysis in acidic medium).

This decoupling of the process,
on the one hand, into an electrolysis step leading to the storage of energy in chemical form, and, on the other hand, into a step of electrochemical conversion of this energy into gaseous hydrogen,
makes it possible to collect gaseous hydrogen under a higher pressure than that obtained with the devices of the prior art mentioned above.

However, the industrialization and streamlining of the production of pressurized gaseous hydrogen require substantial improvements in terms of the attainable pressure, without sacrificing the constraints of simplicity, economy, and safety.

Objectives of the Invention

In these circumstances, the invention aims to satisfy at least one of the objectives set out below.

☞ One of the essential objectives of the invention is to provide an improved process for the electrochemical production of pressurized gaseous hydrogen, in a decoupled manner, in order to achieve high pressures of gaseous hydrogen, for example >80 bar.

☞ One of the essential objectives of the invention is to provide an improved and simple to implement process for the electrochemical production of pressurized gaseous hydrogen, in a decoupled manner, ☞ One of the essential objectives of the invention is to provide an improved process for the electrochemical production of pressurized gaseous hydrogen, in a decoupled manner, and without sacrificing industrial safety requirements.

☞ One of the essential objectives of the invention is to provide an improved and economical process for the electrochemical production of pressurized gaseous hydrogen, in a decoupled manner.

☞ One of the essential objectives of the invention is to provide an improved process for the electrochemical production of pressurized gaseous hydrogen, in a decoupled manner and while respecting environmental constraints.

☞ One of the essential objectives of the invention is to provide an improved process for the electrochemical production of pressurized gaseous hydrogen, in a decoupled manner and which can be implemented in a non-industrial environment and not under the control of specialized operators, in other words at a gaseous hydrogen distribution site, completely independently.

☞ One of the essential objectives of the invention is to provide an industrial device that is reliable, efficient, economical, and robust, for implementing the process referred to in one of the above objectives.

BRIEF DESCRIPTION OF THE INVENTION

These objectives, among others, are achieved by the present invention, which firstly relates to an electrochemical process for the production of pressurized gaseous hydrogen, characterized in that it consists essentially of implementing, in a decoupled manner, at least one step $E^{\ell}$ of electrolysis of a preferably aqueous electrolyte, this electrolysis step $E^{\ell}$ producing gaseous oxygen in a chamber $E^{\ell}$, and at least one step $C°$ of electrochemical conversion of H+ ions into gaseous hydrogen in a chamber $C°$ which is identical to or different from chamber $E^{\ell}$ and which contains a liquid phase L and a gas phase G not dissolved in this liquid phase; wherein:

the electrolysis step $E^{\ell}$ involves at least one cathode on which at least one ionic species is electrochemically reduced and an anode on which at least one oxygen evolution reaction takes place;

the gaseous hydrogen produced in the conversion step $C°$ is partly present in the gaseous headspace of chamber $C°$ and as bubbles in the electrolyte, and partly dissolved in the electrolyte which is thus saturated or even supersaturated with hydrogen;

the electrolyte comprises at least one redox pair (A/B) forming at least one intermediate vector enabling the decoupling of steps $E^{\ell}$ & $C°$, with:
acidic electrolyte:

$E_{th}(A/B) < E_{th}(O_2/H_2O)$;

$|\Delta[E_{th}(A/B) - E_{th}(O_2/H_2O)]| \geq 100 \ mV$ basic electrolyte:

$E_{th}(A/B) < E_{th}(O_2/OH^-)$;

$|\Delta[E_{th}(A/B) - E_{th}(O_2/OH^-)]| \geq 100 \ mV$ the interface between the undissolved gas phase G and the liquid phase L—hereinafter referred to as the G/L interface—is increased at least during step $C°$, so as to accelerate the diffusion, from the liquid phase to the gas phase, of the dissolved hydrogen able to supersaturate the electrolyte;

and the pressurized gaseous hydrogen is collected in a storage tank.

The process according to the invention is particularly efficient and advantageous in that it consists of carrying out an electrochemical compression integrated with the electrolysis of an electrolyte, preferably aqueous and even more preferably water, so as to directly produce very highly pressurized hydrogen in a decoupled manner, by means of an intermediate vector consisting of a Redox pair (A/B), in two independent steps: electrolysis with release of oxygen, then oxidation of B to A with release of hydrogen.

This process overcomes the difficulty associated with the desired increase in the pressure of gaseous hydrogen. This overpressure in fact causes two problems. The first problem is the solubilization of hydrogen in the electrolyte, particularly in the electrolyte formed by an aqueous solution containing ions. The second problem is the possible supersaturation of the electrolyte with dissolved hydrogen. This supersaturation is defined as the ratio of the concentration of dissolved gas to its solubility, i.e. the concentration at equilibrium. These two problems have the effect of limiting the production of gaseous hydrogen.

The process according to the invention appropriately remedies this by making use of operations and associated means enabling the increase of the G/L interface at least during step $C°$, preferably only during this step $C°$, while promoting desorption by diffusion of the dissolved gas supersaturating the electrolyte.

According to a preferred arrangement of the invention, the increase of the interface is carried out by implementing at least one of the following operations:

(i) forced circulation, which preferably consists of generating an electrolyte flow in chamber $E^{\ell} C°$ or $C°$, more preferably using at least one pump so as to evacuate and replenish the gas bubbles present on the electrode or electrodes or the catalyst(s) and on any roughnesses of chamber $E^{\ell} C°$ or $C°$;

(ii) at least partial substitution of the dissolved hydrogen by at least one neutral gas, by injection of the latter into chamber $E^{\ell} C°$ or $C°$ to generate bubbles of neutral gas intended to evacuate and replenish the gas bubbles present on the electrode or electrodes, on any catalyst(s) not dissolved in the electrolyte, and/or on any roughnesses of chamber $E^{\ell} C°$ or $C°$;

(iii) partial decompression, which consists of isolating the storage tank from chamber $E^{\ell} C°$ or $C°$, in order to increase the pressure of gaseous hydrogen in the chamber; then when this pressure is greater than that in the storage tank, a decompression of chamber $E^{\ell} C°$ or $C°$ is performed, which creates or increases the supersaturation of $H_2$ in the electrolyte and therefore promotes the formation of bubbles;

(iv) spraying the electrolyte as droplets into the gaseous headspace of chamber $E^f$ $C°$ or $C°$, (v) at least one heating, preferably at least one localized heating, of the electrolyte, which advantageously consists of locally reducing the solubility of the dissolved gaseous hydrogen, thus promoting the nucleation of bubbles, (vi) subjecting the electrolyte to ultrasound to generate bubbles, (vii) at least one depolarization, preferably at least one localized depolarization of the electrolyte, which preferably consists of accelerating the kinetics of the hydrogen formation reaction in order to locally increase supersaturation and promote the formation of bubbles, (viii) making use of nanoparticles and/or at least one porous nucleation material in the electrolyte, to promote the nucleation of bubbles and increase the number of bubbles nucleation sites, (ix) mechanical stirring of the electrolyte, which promotes the nucleation of bubbles by providing the energy necessary to counteract the surface tension.

In another of its aspects, the invention relates to devices for implementing the process.

Another object of the invention relates to a kit for implementing the process, comprising a device and at least some of the components for preparing the electrolyte or electrolytes intended to be contained in the chamber or chambers of the device.

Definitions

Throughout this disclosure, any singular designates a singular or a plural.

The definitions given below as examples may serve in interpreting this disclosure:

"electrolyte": aqueous or ionic liquid solution containing ions A, B, $Y^{y+}$, $Y^{y-}$, $H^+$, $OH^-$ "electrolyte or acidic medium": pH<7 (+/−0.1)

"electrolyte or basic medium": pH>7 (+/−0.1)

"$E°$": standard electrode potential. The standard electrode potentials $E°$ referred to in this disclosure are all measured under the same conditions (reference, temperature, concentrations).

"$E_{th}$": thermodynamic potential of the electrochemical reaction.

"E": out-of-equilibrium potential of the electrochemical reaction, equal to the sum of the thermodynamic potential and the overvoltage of the electrochemical reaction.

"decoupled": defines the process as being implemented in two separate and independent steps; the first of these steps being an electrolysis leading to the reduction of ions A into a reducing agent B (which may be in solid or ionic form) constituting a storage of electrochemical energy, while the second step is a step of electrochemical oxidation of B into ions A with production of gaseous hydrogen by reduction of $H^+$ ions;

"about" or "substantially" means within plus or minus 10%, or even plus or minus 5%, relative to the unit of measurement used;

"between Z1 and Z2" means that one and/or the other of the endpoints Z1, Z2 is or is not included in the interval [Z1, Z2].

DETAILED DESCRIPTION OF THE INVENTION

Process

The electrochemical compression specific to the process according to the invention is part of a process with two decoupled and independent steps, namely, the electrolysis of at least one of the ions contained in the electrolyte (preferably an aqueous solution) on the one hand, and on the other hand the oxidation of at least one of the species reduced at the cathode during electrolysis, concurrently with the production of hydrogen by reduction of the $H^+$ ions contained in the electrolyte.

Increasing the G/L Interface

In practice, this can be achieved by at least one of the following proposals:

Circulation (forced or "gas lift") in chamber $E^f$ $C°$: this allows the bubbles remaining stuck to the roughnesses of the wall to be carried away by capillary action, freeing the space and allowing the appearance of new bubbles.

Spray: the electrolyte is sprayed into the gaseous headspace of the reactor.

Hot spot: the solubility of hydrogen decreases with temperature. By applying a hot spot or several hot spots in the electrolyte, supersaturation is locally increased, and by doing so the appearance of bubbles is encouraged.

Ultrasound: the principle here is to cause bubbles to appear by generating ultrasound in the supersaturated electrolyte, similar to the phenomenon of acoustic cavitation. The generated bubbles absorb the gas supersaturing the electrolyte and remain stable.

Local depolarization: by locally accelerating the kinetics of hydrogen evolution, the supersaturation around this area is increased, promoting the appearance of bubbles.

Use of a non-aqueous solution: an ionic liquid. This is because the solubility of hydrogen is very low in this type of liquid.

Introducing nanoparticles into the electrolyte: will create nucleation points, promoting the formation of hydrogen bubbles.

Mechanical stirring: This promotes the nucleation of bubbles at the roughnesses present in the reactor, which may be of any type.

Introducing a porous material into the electrolyte, with a particle size appropriate for creating bubbles at a given pressure.

These various technical arrangements specific to the invention have the effect of increasing the diffusion of the gaseous hydrogen supersaturating the electrolyte.

Electrolyte

According to the invention, the electrolyte is preferably an acidic or basic aqueous solution, or an ionic liquid.

Advantageously, the electrolyte is such that the species [$Y^{y+}$, $Y^{y-}$, $H^+$, $OH^-$ ions] which it contains, other than A&B, are not reduced or oxidized before A and B. In other words, this means that these species other than A&B do not react electrochemically within a window of potentials bounded by the potential of the electrode on which the A/B pair reacts and the potential of the electrode on which the $O_2/H_2O$ pair reacts in an acidic medium or $O_2/OH^-$ in a basic medium.

At the start of step $E^f$ is present in the electrolyte in a range of concentrations between 0.1 and 15 mol·$L^{-1}$, preferably between 0.2 and 10 mol·$L^{-1}$ According to one interesting arrangement of the invention, for the implementation of step C°:
at least one hydrogen electrode is immersed in the electrolyte and enables the production of gaseous hydrogen by reduction of the H$^+$ ions of the electrolyte;
and/or the electrolyte comprises at least one catalyst.

Intermediate Vector

The decoupling is made possible by the use of an intermediate vector consisting of at least one redox pair (A/B). This redox pair (A/B) is advantageously characterized by the following two properties:
The thermodynamic potential of the redox pair $E_{th}$(A/B) is preferably lower than that of the pair (O$_2$/H$_2$O) [$E_{th}$(A/B)<$E_{th}$(O$_2$/H$_2$O] in an acidic medium, and lower than that of the pair (O$_2$/OH$^-$) [$E_{th}$(A/B)<$E_{th}$(O$_2$/OH$^-$)] in a basic medium.
The absolute value of the potential difference between these two redox pairs A/B and O$_2$/OH$^-$ or O$_2$/H$_2$O is ideally greater than or equal to 100 mV. The absolute value of this potential difference may be for example between 0.2 and 2V.

In one noteworthy feature of the process according to the invention, B may comprise at least one solid species. For the implementation of step C°, at least one hydrogen electrode is immersed in the electrolyte and enables the production of gaseous hydrogen by reduction of the H$^+$ ions of the electrolyte.

☞ In a first embodiment (F1), the thermodynamic potential of the A/B pair is less than that of the hydrogen evolution reaction (H$^+$/H$_2$) [$E_{th}$(A/B)<$E_{th}$(H$^+$/H$_2$)] with an acidic electrolyte, and less than that of the pair (H$_2$O/H$_2$)[$E_{th}$(A/B)<$E_{th}$(H$_2$O/H$_2$)] with a basic electrolyte.

Advantageously, in the case of the acidic electrolyte, we have:

$$|\Delta[E_{th}(A/B)-E_{th}(H^+/H_2)]|\geq 100\ mV$$

Advantageously, in the case of the basic electrolyte, we have:

$$|\Delta[E_{th}(A/B)-E_{th}(H_2O/H_2)]|\geq 100\ mV$$

Variant No. 1 (F1.1): the Redox air (A/B) is a salt/metal pair.
This redox pair (A/B) is then defined as follows:
A is composed of at least one metal ion of metal M
B is composed of at least metal M;
with M preferably chosen from the metals, and more preferably from the group comprising—ideally composed of: Zn; Cd; Sn; Ni, Mn, Fe, Pb, Co; Zn being particularly preferred.

In accordance with the invention, the metal is chosen such that it can be deposited on the cathode during the electrolysis step $E^f$ with the electrolyte considered, with the best possible yield. Preferably, this means that the absolute value of the overvoltage of the hydrogen evolution reaction on the metal M is greater than the difference $E_{th}$(H$^+$/H$_2$)–$E_{th}$(M$^{m+}$/M) in an acidic medium and the difference $E_{th}$(H$_2$O/H$_2$)–$E_{th}$(M$^{m+}$/M) in a basic medium.

The metal salt A may take the form of hydrated or complex ions.

A is electrolyzed on a suitable cathode, which leads to a deposition of B on this cathode.

According to the invention, the particularly preferred Redox pairs A/B are: Zn$^{2+}$/Zn, Cd$^{2+}$/Cd, Sn$^{2+}$/Sn.

In variant No. 1 of this first embodiment, the following arrangements are preferably selected:

M(i). the electrolysis step $E^f$ and the conversion step C° are carried out in at least one same chamber $E^f$ C° containing the electrolyte, in which at least three electrodes are immersed, namely at least one cathode on which the reduced metal M is deposited during the electrolysis step $E^f$, at least one anode in the vicinity of which is produced gaseous oxygen resulting from the oxidation of water during the electrolysis step $E^f$, and at least one hydrogen electrode inactive during the electrolysis step $E^f$ in the vicinity of which is produced the gaseous hydrogen resulting from reduction of the H+ ions of the electrolyte during the conversion step C°;

M(ii). during the electrolysis step $E^f$, a power supply connected to the cathode and to the anode delivers an electric current, such that the metal M is deposited on the cathode and gaseous oxygen is released at the anode;

M(iii). for the implementation of the conversion step C°,
the chamber $E^f$ C° is (hermetically) sealed,
the cathode of step $E^f$, which becomes the anode of step C°, is connected to the hydrogen electrode by an electrical conductor so as to function as a battery being discharged, such that the metal M is dissolved in the electrolyte at the anode of C° and gaseous hydrogen is released and compressed in the gaseous headspace of the sealed chamber $E^f$ C°,
and means for increasing the G/L interface are put into operation to promote the transformation of the dissolved gas in the electrolyte, in particular hydrogen, into undissolved gas.

According to even more preferred arrangements of this variant No. 1:
the electrolyte is an aqueous saline solution comprising at least one metal salt M preferably chosen from: sulfates, nitrates, chlorides, citrates, phosphates, carbonates, fluorides, bromides, oxides, aqueous hydroxide solutions of alkali metals or alkaline earth metals, or mixtures thereof; as well as a Bronsted-Lowry acid or base;
the cathode is made from a material allowing deposition of the metal M with a Faraday efficiency of at least 30%, preferably at least 50%, this material preferably being chosen from the group of metals and/or metal alloys, comprising—and ideally composed of: Al, Pb and Pb alloys, carbon-based materials, nickel-based materials, and/or iron-based materials, stainless steels, and combinations of these materials;
the anode is
either created from a material chosen:
from the group of metals and/or metal alloys, comprising and ideally composed of: Pb and Pb alloys, in particular Pb—Ag—Ca or Pb—Ag alloys, steels, iron, nickel;
from the group of oxides, preferably metal oxides, or oxides of perovskite structure;
and combinations of these materials;
or is composed of a dimensionally stable anode (DSA);
the hydrogen electrode is made from a material chosen from the transition metals, lanthanides, and/or alkaline earth metals, and more preferably still from the group comprising—and ideally composed of: platinum and platinoids in metal or oxide form, tungsten, molybdenum, titanium, or zirconium in the form of oxide, of carbide, of sulfide, or of borides, silver, nickel, iron, cobalt, and base alloys of at least one or more of these elements, composites formed by one of these elements or alloyed with an oxide, carbon-based materials (e.g. fine carbon particles, organometallic material, graphene), and combinations of these materials.

In the first step $E^f$ of this variant No. 1, the invention uses the property that certain metals or alloys have of kinetically blocking the release of hydrogen: this is the phenomenon called hydrogen overvoltage, leading to an out-of-balance electrochemical state. This first step $E^f$ consists of carrying out an electrolysis between the cathode and the anode, which leads to a release of oxygen and to a local variation in the pH of the electrolyte at the anode resulting from the non-release of gaseous hydrogen and to an accumulation of energy corresponding to the out-of-equilibrium state. The cathode is the site of an electrochemical reduction from A to B.

As was true for the metal B, as explained above, the cathode material (substrate) advantageously has a high overvoltage for the hydrogen evolution reaction, with the electrolyte considered. For example, this overvoltage may be greater than or equal to 50 mV.

In one noteworthy feature of the invention, the cathode material may be aluminum, a lead-based alloy, an alloy based on nickel and/or on iron, a stainless steel, a carbon-based material, or a combination of these materials.

In this step $E^f$ of this variant No. 1 of the first embodiment, the cathode and the anode are both immersed in the same electrolyte, with no physical separation between them.

The second step $C°$ of this variant No. 1 of the first embodiment consists of implementing the solutions which make it possible to re-establish the state of equilibrium by releasing the energy accumulated during step $E^f$, in other words:
  electrochemically oxidizing B to A,
  releasing the pressurized gaseous hydrogen.

According to the invention, this second step $C°$ comprises making use of specific operations and associated means in order to remove two barriers to the release of pressurized gaseous hydrogen, namely: the blocking of the electrochemical kinetics and the solubilization of the hydrogen in the electrolyte.

The use of a third hydrogen electrode thus makes it possible to accelerate the very low kinetics of the electrochemical oxidation from B to A and of the hydrogen evolution reaction (low kinetics which are the origin of the phenomenon observed during the electrolysis of the first step $E^f$. This third electrode catalyzes the hydrogen evolution reaction.

It is inactive during the electrolysis phase (step $E^f$) and is polarized during the conversion step $C°$, by the discharging between itself and the electrode on which the metal is deposited.

This third hydrogen electrode is, for example, made from platinum or other platinoids in the form of metal or tungsten carbide.

The other obstacle to optimizing the release of hydrogen during the electrochemical compression of gaseous hydrogen is the solubilization of the latter in the electrolyte.

The solubility of hydrogen $\sigma_{H_2}(T,P)$, in other words the concentration of dissolved gas at equilibrium with the gas phase, depends on temperature and pressure. The dependence on pressure is more or less linear, according to Henry's law:

$$\sigma_{H_2}(T, P) = \sigma_{H_2}(T, P^0) \frac{P}{P^0}$$

Moreover, since the hydrogen was initially produced in dissolved form at the electrode, it accumulates in the electrolyte and the concentration may rise above the solubility. This means that the dissolved gas is not in equilibrium with the gas present in the gas phase. We thus experimentally observe supersaturation phenomena which can lead to trapping the gas in the electrolyte with apparent quantities up to 6 times greater than the theoretical solubility. This supersaturation can be measured using a hydrogen electrode and a reference electrode. According to Nernst's law, the equilibrium potential of the hydrogen electrode depends on the activity of the gas and of the $H^+$ protons in solution, according to the following expression:

$$E = E^0 + \frac{RT}{2F} \ln \frac{a_{H^+}^2}{a_{H_2}}$$

where R, T, and F are respectively the ideal gas constant, the electrolyte temperature, and the Faraday constant. In the presence of supersaturation $\xi_S$, the activity of the hydrogen $\alpha_{H_2}$ is related to the value of its equilibrium with the gas phase $\alpha_{H_2}^{eq}$, by the expression $\alpha_{H_2} = \xi_S \alpha_{H_2}^{eq}$. At a given measured pressure, it is therefore possible to measure this supersaturation from the shift in the potential of the hydrogen electrode relative to its equilibrium value:

$$\Delta E = \frac{RT}{2F} \ln \xi_S$$

For supersaturation by a factor of 6, this voltage shift is 24 mV, which is within the measurement range of a reference electrode. During the phenomenon of desupersaturation, desorption of the supersaturated gas is observed, which is generally accompanied by an increase in pressure. In this case, the decrease in the supersaturation rate is related both to the decrease in the concentration of dissolved gas and to the increase in its solubility due to the increase in pressure. The shift in potential tends towards 0 once the concentration of dissolved gas has reached equilibrium with the gas phase.

The objective of increasing the pressure of the gaseous oxygen produced therefore causes the appearance of two phenomena, namely the increase in solubility and the appearance of supersaturation. In both cases, this leads to trapping hydrogen in the electrolyte.

The arrangement according to the invention, of increasing the G/L interface in order to increase diffusion of the gaseous hydrogen supersaturating the electrolyte, contributes to the elimination of these antagonistic phenomena.

Variant No. 2 (F1.2) the Redox pair is an ion/ion pair.
  This redox pair (A/B) is then defined as follows:
  A is composed of at least one ion $I^A$ whose number of valence electrons is V1;
  B is composed of at least one ion $I^B$ whose number of valence electrons V2<V1; with I preferably chosen from the ions resulting from atoms chosen from the group comprising—ideally composed of: Fe; U; Cr, S; V; iron and vanadium being particularly preferred.

A and B thus each comprise at least one ionic species, the electrolyte comprising at least one hydrogen electrode and/or at least one catalyst during step C°.

This variant No. 2 can be executed according to three sub-variants.

In a first sub-variant, the return to equilibrium is achieved by means of a hydrogen electrode, while in a second sub-variant, the return to equilibrium is achieved by means of a catalyst; the third sub-variant is a combination of the first two.

Sub-variant No. 1 (F1.2.1): Use of a hydrogen electrode for the conversion step C°.

In this sub-variant, the following arrangements are preferably selected:

the electrolysis step $E^f$ and the conversion step C° are carried out in one and the same chamber $E^f C°$;

the chamber $E^f C°$ comprises:
  at least one electrochemical compartment (J) containing an electrolyte composed of a catholyte including the redox pair (A/B) in which is immersed at least one cathode in the vicinity of which the $I^B$ ions are reduced to $I^B$ ions,
  and at least one electrochemical compartment (K) containing an electrolyte composed of an anolyte in which are immersed at least one anode and at least one hydrogen electrode,
  these two electrochemical compartments being separated by at least one ion-exchange membrane;

during the electrolysis step $E^f$, a power supply connected to the cathode and to the anode delivers an electric current, such that the $I^A$ ions are reduced to $I^B$ ions at the cathode and such that the oxidation of the water leads to a release of gaseous oxygen at the anode;

for the implementation of the conversion step C°:
  the chamber $E^f C°$ is hermetically sealed,
  the cathode of step $E^f$, which becomes the anode of step C°, is connected to the hydrogen electrode by an electrical conductor so as to function as a battery being discharged, in the chamber $E^f C°$, which makes it possible to catalyze the oxidation reaction of the $I^B$ ions to $I^A$ ions in compartment (J) concurrently with a reduction of the $H^+$ ions contained in compartment (K) to gaseous hydrogen, which is released and compressed in the gaseous headspace of the sealed chamber $E^f C°$,
  and means for increasing the G/L interface are put into operation to promote the transformation of the dissolved gas in the electrolyte, in particular hydrogen, into undissolved gas;
  and, preferably, at the end of step C°, the $H_2$ electrode is disconnected from the cathode of step $E^f$.

Sub-variant No. 2 (F.2.2): Use of a catalyst for the conversion step C°.

In a first alternative (F1.2.2.1) of this sub-variant No. 2: only one chamber $E^f C°$ is provided for the two steps $E^f \& C°$.

This chamber $E^f C°$ comprises:
  at least one electrochemical compartment (J) containing an electrolyte composed of a catholyte including the redox pair (A/B) in which is immersed at least one cathode in the vicinity of which the $I^A$ ions are reduced to $I^B$ ions,
  and at least one electrochemical compartment (K) containing an electrolyte composed of an anolyte in which at least one anode is immersed,
  these two electrochemical compartments being separated by at least one ion-exchange membrane;

During the electrolysis step $E^f$, a power supply connected to the cathode and to the anode delivers an electric current, such that the $I^A$ ions are reduced to $I^B$ ions at the cathode and such that the oxidation of the water leads to a release of gaseous oxygen at the anode;

For the implementation of the conversion step C°:
  a catalyst is introduced into the catholyte in compartment (J) of the hermetically sealed chamber $E^f C°$, in order to catalyze the oxidation reaction of $I^B$ ions to $I^A$ ions concurrently with a reduction of the $H^+$ ions contained in the catholyte to gaseous hydrogen which is released and compressed in the gaseous headspace of the sealed chamber $E^f C°$,
  and means for increasing the G/L interface are put into operation to promote the transformation of the dissolved gas in the electrolyte, in particular hydrogen, into undissolved gas;

At the end of step C°, the catalyst is extracted from the chamber $E^f C°$.

In a second alternative (F1.2.2.2) of this sub-variant No. 2:

the chamber $E^f$ comprises:
  at least one electrochemical compartment (J) containing an electrolyte composed of a catholyte including the redox pair (A/B) in which is immersed at least one cathode in the vicinity of which the $I^A$ ions are reduced to $I^B$ ions,
  and at least one electrochemical compartment (K) containing an electrolyte composed of an anolyte in which at least one anode is immersed,
  these two electrochemical compartments being separated by at least one ion-exchange membrane;

during the electrolysis step $E^f$, a power supply connected to the cathode and to the anode delivers an electric current, such that the $I^A$ ions are reduced to $I^B$ ions at the cathode and such that the oxidation of the water leads to a release of gaseous oxygen at the anode;

for the implementation of the conversion step C°:
  the catholyte is transferred to a hermetically sealed chamber C° which contains at least one catalyst for the oxidation reaction of $I^B$ ions to $I^A$ ions concurrently with a reduction of the $H^+$ ions contained in the catholyte to gaseous hydrogen which is released and compressed in the gaseous headspace of the sealed chamber C°,
  and means for increasing the G/L interface are put into operation to promote the transformation of the dissolved gas in the electrolyte, in particular hydrogen, into undissolved gas;

The catholyte resulting from the conversion step C° is preferably transferred back into chamber $E^f$ for a new electrolysis $E^f$.

In one possible implementation, the electrolysis step $E^f$ and the conversion step C are carried out in two separate chambers $E^f$ and C°.

In another possible implementation, the electrolysis step $E^f$ and the conversion step $C°$ are carried out in the same chamber $E^f C°$.

This variant No. 2 may also be characterized by at least one of the following specifications:

- the catholyte is an aqueous saline solution comprising at least one salt of $I^A$ ions, the counterion preferably being chosen from the following ions: $SO_4^{2-}$, $NO_3^-$, $Cl^-$, $CH_3COO^-$, $PO_4^{3-}$, $CO_3^{2-}$, $C_6H_5O_7^{3-}$, $CN^-$, $HO^-$, $K^+$; $Na^+$, $NH_4^+$, and mixtures thereof;
- the anolyte is an acidic or basic aqueous saline solution;
- the cathode is made from an electronically conductive material, this material preferably being chosen from the group of metals and/or metal alloys, comprising—and ideally composed of: Al, Pb and Pb alloys, carbon-based materials, nickel-based materials, and/or iron-based materials, stainless steels, and combinations of these materials;
- the anode is either created from a material chosen:
  - from the group of metals and/or metal alloys, comprising and ideally composed of: Pb and Pb alloys, in particular Pb—Ag—Ca or Pb—Ag alloys, or steels, iron, nickel;
  - from the group of oxides, preferably metal oxides, or oxides of perovskite structure;
  - and combinations of these materials,
  or is composed of a dimensionally stable anode (DSA);
- the hydrogen electrode is made from a material chosen from the transition metals, lanthanides, and/or alkaline earth metals, and more preferably still from the group comprising—and ideally composed of: platinum and platinoids in metal or oxide form, tungsten, titanium, zirconium, or molybdenum in the form of oxide, of carbide, of sulfide, or of borides, silver, nickel, iron, cobalt, and base alloys of at least one or more of these elements, composites formed by one of these elements or alloyed with an oxide, carbon-based materials (fine carbon particles, organometallic material, graphene), and combinations of these materials;
- the catalyst comprises at least one material chosen from the transition metals, lanthanides, and/or alkaline earth metals, and more preferably still from the group comprising—and ideally composed of: platinum and platinoids in metal or oxide form, tungsten, titanium, zirconium, or molybdenum in the form of oxide, of carbide, of sulfide, or of borides, silver, nickel, iron, cobalt, and base alloys of at least one or more of these elements, composites formed by one of these elements or alloyed with an oxide, carbon-based materials (fine carbon particles, organometallic material, graphene), and combinations of these materials.

During step $E^f$ of variant No. 2, A is electrochemically reduced to B at the cathode. The cathode and anode as well as their respective electrolytes will be physically separated by a membrane, and this A/B pair is only present in the catholyte. As examples of an A/B pair, we can cite: $V^{3+}/V^{2+}$, $Fe(CN)_6^{3-}/Fe(CN)_6^{4-}$.

As for step $C°$ of this variant No. 2, it consists of implementing the solutions which make it possible to re-establish the state of equilibrium by releasing the energy accumulated during step $E^f$, in other words:
- electrochemically oxidizing B to A
- releasing the pressurized gaseous hydrogen.

In this variant No. 2, the increase of the G/L interface, at least during the conversion step $C°$, is carried out in the same manner as defined above for variant No. 1 of the process according to invention.

In sub-variant No. 1 of this variant No. 2 of the process according to the invention, the acceleration of the kinetics of hydrogen evolution is achieved by means of at least one hydrogen electrode, the electrode material being chosen according to the same criteria as in variant No. 1.

In sub-variant No. 2 of this variant No. 2 of the process according to the invention, the acceleration of the kinetics of hydrogen evolution is achieved by means of at least one catalyst.

The catalyst is chosen for its good electrocatalytic properties and its low overvoltage for the hydrogen evolution reaction (e.g. platinoids and their derivatives, carbides and sulfides of tungsten or of molybdenum, nickel, etc.).

☞ In a second embodiment (F2), the thermodynamic potential of the A/B pair is greater than that of the hydrogen evolution reaction $(H^+/H_2)$ $[E_{th}(A/B) > E_{th}(H^+/H_2)]$ in an acidic electrolyte, and greater than that of the pair $(H_2O/H_2)$ $[E_{th}(A/B) > E_{th}(H_2O/H_2)]$ in a basic electrolyte, and is lower than that of the oxygen evolution.

Advantageously, in the case of the acidic electrolyte we have:

$$|\Delta[E_{th}(A/B) - E_{th}(H^+/H_2)]| \geq >100\ mV$$

Advantageously, in the case of the basic electrolyte we have:

$$|\Delta[E_{th}(A/B) - E_{th}(H_2O/H_2)]| \geq 100\ mV$$

Variant No. 1 (F2.1): the Redox pair is a salt/metal pair. This redox pair (A/B) is then defined as follows:
A is composed of at least one metal ion of metal M;
B is composed of at least metal M;
  with M preferably chosen from the metals, and more preferably still from the group comprising—ideally composed of: Cu, Mn. Ag; Cu being particularly preferred.

In accordance with the invention, the metal is chosen such that it can be deposited on the cathode during the electrolysis step $E^f$, with the electrolyte considered, with the best possible yield. Preferably, this means that the absolute value of the overvoltage of the hydrogen evolution reaction on the metal M is greater than the difference $E_{th}(H^+/H_2) - E_{th}(M^{m+}/M)$ in an acidic medium, and greater than the difference $E_{th}(H_2O/H_2) - E_{th}(M^{m+}/M)$ in a basic medium. The metal salt A may take the form of hydrated or complex ions.

A is electrolyzed on a suitable cathode, which leads to a deposition of B on this cathode.

In this variant (F2.1), the following arrangements are preferably selected:

- the electrolysis step $E^f$ and the conversion step $C°$ are carried out in one and the same chamber $E^f C°$;
- the chamber $E^f C°$ comprises:
  - at least one electrochemical compartment (J) containing an electrolyte composed of a catholyte including the redox pair (A/B) in which at least one anode and one cathode are immersed,
  - and at least one electrochemical compartment (K) containing an electrolyte in which at least one hydrogen electrode is immersed,
  - these two electrochemical compartments being separated by at least one ion-exchange membrane;

during the electrolysis step $E^t$, a power supply connected to the cathode and to the anode delivers an electric current, such that the Mm+ ions are deposited in the form of metal M at the cathode and such that the oxidation of the water leads to a release of gaseous oxygen at the anode;

for the implementation of the conversion step C°:

the chamber $E^t$ C° is hermetically sealed, the cathode of step $E^t$, which becomes the anode of step C°, is connected to the hydrogen electrode by a power supply which delivers an electric current so that the metal M is oxidized to ions $M^{m+}$ in compartment (J) concurrently with a reduction of the $H^+$ ions contained in compartment (K) to gaseous hydrogen, which is released and compressed in the gaseous headspace of the sealed chamber $E^t$ C°, and means for increasing the G/L interface are put into operation to promote the transformation of dissolved gas in the electrolyte, in particular hydrogen, into undissolved gas;

and, preferably, at the end of step C°, the $H_2$ electrode is disconnected from the cathode of step $E^t$.

Variant No. (F2.2); the Redox pair is an ion/ion pair.

This redox pair (A/B) is then defined as follows:

A is composed of at least one ion $I^A$ whose number of valence electrons is V1;

B is composed of at least one ion $I^B$ whose number of valence electrons V2<V1; with I preferably chosen from the ions resulting from atoms chosen from the group comprising—ideally composed of: Fe, V, Mn; iron and vanadium being particularly preferred.

A and B thus each comprise at least one ionic species.

In this 2nd variant (F2.2) of the second embodiment, some arrangements are preferably selected:

the electrolysis step $E^t$ and the conversion step C° are carried out in one and the same chamber $E^t$ C°, the chamber $E^t$ C° comprises:
  at least one electrochemical compartment containing an electrolyte composed of a catholyte including the redox pair (A/B) in which is immersed at least one cathode in the vicinity of which the $I^A$ ions are reduced to $I^B$ ions,
  and at least one electrochemical compartment containing an electrolyte composed of an anolyte in which at least one anode is immersed,
  at least one hydrogen electrode immersed in the anolyte,
  these two electrochemical compartments being separated by at least one ion-exchange membrane;

during the electrolysis step $E^t$, a power supply connected to the cathode and to the anode delivers an electric current, such that the $I^A$ ions are reduced to $I^B$ ions at the cathode and such that the oxidation of the water leads to a release of gaseous oxygen at the anode;

for the implementation of the conversion step C°, the chamber $E^t$ C° is hermetically sealed, a hydrogen electrode is immersed in the anolyte if it was not already present during the electrolysis step Et, the cathode of step $E^t$, which becomes the anode of step C°, is connected to the hydrogen electrode by a power supply so as to carry out the electrochemical oxidation reaction of the $I^B$ ions to $I^A$ ions concurrently with an electrochemical reduction of the $H^+$ ions contained in the anolyte to gaseous hydrogen, which is released and compressed in the gaseous headspace of the sealed chamber $E^t$ C°, and means for increasing the G/L interface are put into operation to promote the transformation of the dissolved gas in the electrolyte, in particular hydrogen, into undissolved gas;

and, at the end of step C°, the $H_2$ electrode is disconnected from the cathode of step $E^t$.

This variant No. 2 (F2.2) may also be characterized by at least one of the following specifications:

the catholyte is an aqueous saline solution comprising at least one salt of $I^A$ ions, its counterion preferably being chosen from the following ions: $SO_4^{2-}$, $NO_3^-$, $Cl^-$, $CH_3COO^-$, $PO_4^{3-}$, $CO_3^{2-}$, $C_6H_5O_7^{3-}$, $CN^-$, $HO^-$, $K^+$; $NH_4^+$, $Na^+$, and mixtures thereof;

the anolyte is an acidic or basic aqueous saline solution;

the cathode is made from an electronically conductive material, this material preferably being chosen from the group of metals and/or metal alloys, comprising—and ideally composed of: Al, Pb and Pb alloys, carbon-based materials, nickel-based materials, and/or iron-based materials, stainless steels, and combinations of these materials;

the anode is
either created from a material chosen:
  from the group of metals and/or metal alloys, comprising and ideally composed of: Pb and Pb alloys, in particular Pb—Ag—Ca or Pb—Ag alloys, steels, iron, nickel;
  from the group of oxides, preferably metal oxides, or oxides of perovskite structure;
  and combinations of these materials,
or is composed of a dimensionally stable anode (DSA);

the hydrogen electrode is made from a material chosen from the transition metals, lanthanides, and/or alkaline earth metals, and more preferably still from the group comprising—and ideally composed of: platinum and platinoids in metal or oxide form, tungsten, titanium, zirconium, or molybdenum in the form of oxide, of carbide, of sulfide, or of borides, silver, nickel, iron, cobalt, and base alloys of at least one or more of these elements, composites formed by one of these elements or alloyed with an oxide, carbon-based materials (fine carbon particles, organometallic material, graphene), and combinations of these materials.

During step $E^t$ of this variant No. 2, A is electrochemically reduced to B at the cathode. The cathode and anode as well as their respective electrolytes will be physically separated by a membrane, and this A/B pair is only present in the catholyte. As examples of an A/B pair, we can cite: $VO_2^+/VO^{2+}$, $VO^{2+}/V^{3+}$, $Fe(CN)_6^{3-}/Fe(CN)_6^{4-}$.

As for step C° of this variant No. 2, it consists of implementing the solutions which make it possible to re-establish the state of equilibrium by releasing the energy accumulated during step $E^t$, in other words:
electrochemically oxidizing B to A
releasing the pressurized gaseous hydrogen.

For the two variants No. 1 (F2.1) and No. 2 (F2.2) of the second embodiment (F2), we can define a common protocol in which:

the electrolysis step $E^f$ and the conversion step $C°$ are carried out in one and the same chamber $E^f C°$;

the chamber $E^f C°$ comprises:
- at least one electrochemical compartment (J) containing an electrolyte including the redox pair (A/B),
- and at least one electrochemical compartment (K) containing an electrolyte in which at least one hydrogen electrode is immersed,
- these two electrochemical compartments being separated by at least one ion-exchange membrane;
- at least one anode;
- at least one cathode;

during the electrolysis step $E^f$, a power supply connected to the cathode and to the anode delivers an electric current, such that the A ions are reduced to B at the cathode and such that the oxidation of the water leads to a release of gaseous oxygen at the anode;

for the implementation of the conversion step $C°$:
- the chamber $E^f C°$ is hermetically sealed,
- the cathode of step $E^f$, which becomes the anode of step $C°$, is connected to the hydrogen electrode by a power supply which delivers an electric current so that the reducing agents B are oxidized to ions A in compartment (J) concurrently with a reduction of the $H^+$ ions contained in compartment (K) to gaseous hydrogen, which is released and compressed in the gaseous headspace of the sealed chamber $E^f C°$,
- and means for increasing the G/L interface are put into operation to promote the transformation of dissolved gas in the electrolyte, in particular hydrogen, into undissolved gas.

In variants No. 1 (F2.1) and No. 2 (F2.2) of the second embodiment (F2):
- the increase in the G/L interface, at least during the conversion step $C°$, is carried out in the same manner as defined above for variant No. 1 of the process according to the invention;
- and the acceleration of the hydrogen evolution kinetics is carried out by means of at least one hydrogen electrode, the electrode material being chosen according to the same criteria as in variant No. 1 of the first embodiment.

According to an optional but nevertheless advantageous arrangement of the process according to the invention, it is possible to reinforce the kinetics at least of step $C°$, by circulation of the electrolyte or electrolytes in the chambers $C°$ or $E^f C°$, and/or by heating the electrolyte or electrolytes to a temperature above room temperature.

This arrangement is also a possible operation for increasing the G/L interface according to the invention.

Devices

In another of its aspects, the invention relates to devices for implementing the process.

☞ The preferred device for the first embodiment (F1) comprises:
a. at least one sealed chamber $E^f C°$ intended to contain at least one electrolyte;
b. at least one cathode intended to be immersed in the electrolyte;
c. at least one anode intended to be immersed in the electrolyte;
d. at least one hydrogen electrode intended to be immersed in the electrolyte;
e. a power supply intended to connect the cathode to the anode;
f. an electrical conductor intended to connect the cathode to the hydrogen electrode;
g. and means for increasing the G/L interface;
h. possibly means for circulating the electrolyte or electrolytes in the chamber $E^f C°$;
i. possibly means for regulating the temperature of the electrolyte or electrolytes in the chamber $E^f C°$.

☞ The preferred device for sub-variant No. 1 (F1.2.1) of variant No. 2 (F1.2) of the first embodiment (F1) comprises:

a'. at least one sealed chamber $E^f C°$ comprising:
- at least one 1st electrochemical compartment (J) intended to contain a catholyte including the redox pair (A/B),
- and at least one 2nd electrochemical compartment (K) intended to contain an anolyte,
- and at least one ion-exchange membrane, preferably cationic, separating these two compartments (J) (K);

b'. at least one cathode of step $E^f$ intended to be immersed in the catholyte;

c'. at least one anode of step $E^f$ intended to be immersed in the anolyte;

d'. at least one $H_2$ electrode intended to be placed in the 2nd electrochemical compartment (K) and enabling, once electrically connected to the cathode of step $E^f$ which has become the anode of step $C°$ in order to behave like a battery being discharged, the oxidation reaction of $I^B$ ions to $I^A$ ions;

e'. a power supply intended to connect the cathode of step $E^f$ to the anode of step $E^f$;

f'. an electrical conductor intended to connect the cathode of step $E^f$, which has become the anode of step $C°$, to the hydrogen electrode;

g'. means for increasing the G/L interface;

h'. possibly means for circulating the electrolyte or electrolytes in the chamber $E^f C°$;

i'. and possibly means for heating and/or cooling the electrolyte or electrolytes in the chamber $E^f C°$.

☞ The preferred device for sub-variant No. 2 (F1.2.2), first alternative (F1.2.2.1), of the $2^{nd}$ variant (F1.2) of the first embodiment (F1) comprises:

a".1. a single sealed chamber $E^f C°$ comprising:
- at least one electrochemical compartment (J) intended to contain a catholyte including the redox pair (A/B),
- at least one electrochemical compartment (K) intended to contain an anolyte,
- at least one ion-exchange membrane, preferably cationic, separating these two compartments;
- and at least one catalyst;

b".1. at least one cathode of step $E^f$ intended to be immersed in the catholyte;

c".1. at least one anode of step $E^f$ intended to be immersed in the anolyte;

d".1. a power supply intended to connect the cathode of step $E^f$ to the anode of step $E^f$;

e".1. means for increasing the G/L interface;

f".1. possibly means for circulating the electrolyte or electrolytes in the chamber $E^f C°$;

g".1. and possibly means for heating and/or cooling the electrolyte or electrolytes in the chamber $E^f C°$.

☞ The preferred device for sub-variant No. 2 (F1.2.2), second alternative (F1.2.2.2), of the 2$^{nd}$ variant (F1.2) of the first embodiment (F1) comprises:

a".2. at least one chamber $E^f$ comprising:
 at least one electrochemical compartment (J) intended to contain a catholyte including the redox pair (A/B),
 and at least one electrochemical compartment (K) intended to contain an anolyte,
 at least one membrane, preferably cationic, separating these two compartments;

b".2. at least one chamber C° comprising:
 at least one catalyst;

c".2. at least one cathode of step $E^f$ intended to be immersed in the catholyte;

d".2. at least one anode of step $E^f$ intended to be immersed in the anolyte;

e".2. a power supply intended to connect the cathode of step $E^f$ to the anode of step $E^f$;

f".2. means for increasing the G/L interface;

g".2. means for circulating the electrolyte or electrolytes between chambers $E^f$ and C°;

h".2. and possibly means for heating and/or cooling the electrolyte or electrolytes in chambers Et and C°.

☞ The preferred device for the second embodiment (F2) comprises:

aa. at least one sealed chamber $E^f C°$ comprising:
 at least one electrochemical compartment (J) intended to contain an electrolyte including the redox pair (A/B),
 and at least one electrochemical compartment (K) intended to contain an electrolyte,
 at least one membrane, preferably cationic, separating these two compartments;

ab. at least one cathode of step $E^f$ intended to be immersed in the electrolyte of compartment (J);

ac. at least one anode of step $E^f$ intended to be immersed in the electrolyte of compartment (J) or of compartment (K);

ad. at least one hydrogen electrode intended to be immersed in the electrolyte of compartment (K);

ae. at least one power supply intended to connect the cathode of step $E^f$ the anode of step $E^f$;

af. at least one power supply intended to connect the cathode of step $E^f$, which has become the anode of step C°, to the hydrogen electrode;

ag. means for increasing the G/L interface;

ah. possibly means for circulating the electrolyte or electrolytes in chambers $E^f$ and C°;

ai. and possibly means for regulating the temperature of the electrolyte or electrolytes in chambers $E^f$ and C°.

☞ The preferred device for variant No. 1 (F2.1) of the second embodiment (F2) comprises:

aa'. at least one sealed chamber $E^f C°$ comprising:
 at least one electrochemical compartment (J) intended to contain an electrolyte including the redox pair (A/B),
 and at least one electrochemical compartment (K) intended to contain an electrolyte,
 at least one membrane, preferably cationic, separating these two compartments;

ab'. at least one cathode of step $E^f$ intended to be immersed in the electrolyte of compartment (J);

ac'. at least one anode of step $E^f$ intended to be immersed in the electrolyte of compartment (J);

ad'. at least one hydrogen electrode intended to be immersed in the electrolyte of compartment (K);

ae'. at least one power supply intended to connect the cathode of step $E^f$ to the anode (d) of step $E^f$;

af. at least one power supply intended to connect the cathode of step $E^f$, which has become the anode of step C°, to the hydrogen electrode;

ag'. means for increasing the G/L interface;

ah'. possibly means for circulating the electrolyte or electrolytes in chambers $E^f$ and C°;

ai'. and possibly means for regulating the temperature of the electrolyte or electrolytes in chambers $E^f$ and C°.

☞ The preferred device for variant No. 2 (F2.2) of the second embodiment (F2) comprises:

aa". at least one sealed chamber Ea C° comprising:
 at least one electrochemical compartment (J) intended to contain an electrolyte including the redox pair (A/B),
 and at least one electrochemical compartment (K) intended to contain an electrolyte,
 and at least one ion-exchange membrane, preferably cationic, separating these two compartments;

ab". at least one cathode of step $E^f$ intended to be immersed in the electrolyte of compartment J;

ac". at least one anode of step $E^f$ intended to be immersed in the electrolyte of compartment K;

ad". at least one hydrogen electrode intended to be immersed in the electrolyte of compartment K;

ae". at least one power supply intended to connect the cathode of step $E^f$ to the anode of step $E^f$;

af". at least one power supply intended to connect the cathode of step $E^f$, which has become the anode of step C°, to the hydrogen electrode;

ag". means for increasing the G/L interface;

ah". possibly means for circulating the electrolyte or electrolytes in the chamber $E^f C°$;

ai". and possibly means for heating and/or cooling the electrolyte or electrolytes in the chamber $E^f C°$.

Kit

Another object of the invention is a kit for implementing the process. This kit is characterized in that it comprises:

Either the device for carrying out variant No. 1 F1.1 of the first embodiment F1 of the process according to the invention, and at least some of the components for the preparation of the electrolyte intended to be contained in the chamber of the device;

Or the device for carrying out variants No. 2 F1.2 of the first embodiment F1 of the process according to the invention and the second embodiment F2 of the process according to the invention, and at least some of the components for the preparation of the catholyte and anolyte intended to be contained in the two electrochemical cells of the chamber of the device.

This kit, which forms a packaged unit for sale, may also comprise an explanatory insert for implementing the process using the device and components contained in this kit.

EXAMPLES

The following examples illustrate variants No. 1 & No. 2 of the first (F1) and second (F2) embodiments of the process according to the invention.

The description of these examples is made with reference to the appended figures, in which:

FIGS. F.1; F1.1; F1.2; F1.2.1; F1.2.2; F1.2.2.1; F1.2.2.2; F2; F2.1; F2.2; are schematic representations of some of the possible variations of the embodiments of the process according to the invention and of the embodiments of the device according to the invention;

Summary table corresponding to figures F.1; F1.1; F1.2; F1.2.1; F1.2.2; F1.2.2.1; F1.2.2.2; F2; F2.1: F2.2

| F1: an electrolysis step and a step of operating as a battery | F2: Two electrolysis steps |
|---|---|
| F1.1: A is an ion/B is a metal (preferably a single chamber) | F1.1: A is an ion/B is a metal (preferably a single chamber) |
| F1.2: A & B are ions: | F1.2: A & B are ions (preferably a single chamber) |
|   F1.2.1: H2 electrode (preferably a single chamber) | |
|   F1.2.2: catalyst | |
|     F1.2.2.1: a single chamber | |
|     F1.2.2.2: two chambers | |

Legend for figures F.1; F1.1; F1.2; F1.2.1; F1.2.2; F1.2.2.1; F1.2.2.2; F2; F2.1; F2.2:
(c): cathode
($H_2$): hydrogen electrode
(a): anode
Mb: membrane
Ct: catalyst
Milieu acide: Acid medium
Milieu basique: Basic medium
Étape: Step Example 1: 1st Embodiment/Variant No. 1: F1.1

Figure 1A:
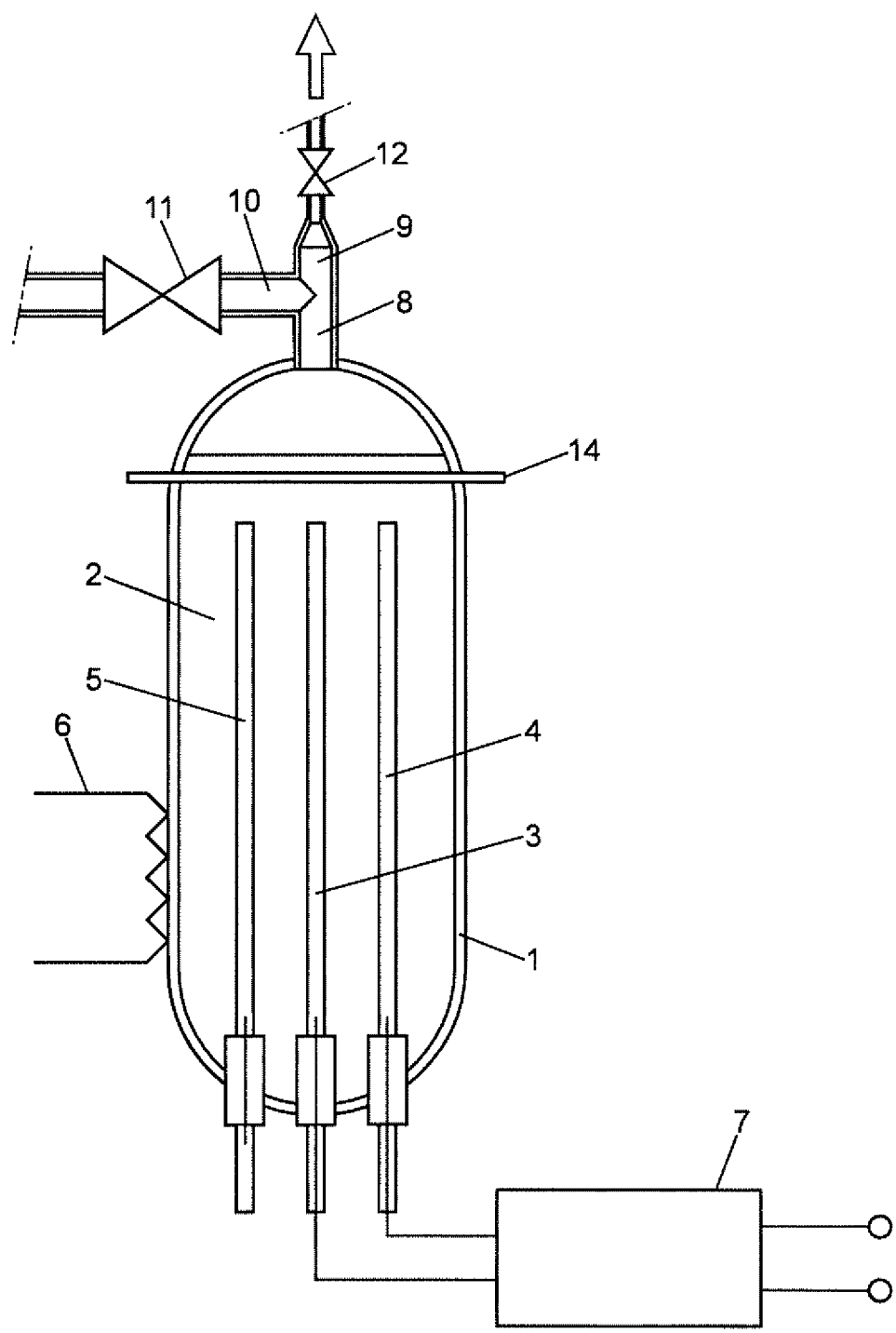
FIG. 1A is a schematic representation of the device used in the electrolysis step $E^f$ of Example 1.

In the following example, hydrogen was produced at 200 bar in the device shown in FIG. 1A. This device is an electrochemical reactor composed of a sealed chamber 1 in which are three electrodes 3,4,5 bathed in an acidic aqueous solution (electrolyte) 2. The three electrodes, which have a surface area of 1 $m^2$, are as follows:

An electrode on which the metal is deposited (cathode), of aluminum 3;

An electrode on which oxygen is released (anode), of lead-silver-calcium alloy 4;

An electrode on which hydrogen is released (hydrogen electrode), of platinum 5.

The electrolyte 2 is composed of zinc ions (concentration 1.5 mol/L) and sulfuric acid (2.55 mol/L). It is prepared by mixing 67 kg of sulfuric acid (37.5%, Brenntag) in 28.6 L of deionized water, then adding 45 kg of zinc sulfate ($ZnSO_4, 7H_2O$) (97.5%, Platret) to this mixture. The reactor 1 is equipped with heating means 6 consisting of exchangers and which enable maintaining the temperature of the electrolyte 2 at 30° C. The reactor 1 is provided with a gas outlet pipe 8, this pipe being subdivided into a pipe 9 for discharging the gaseous oxygen and a pipe 10 for discharging the gaseous hydrogen. Each pipe 9,10 is equipped with a valve 12, 11, respectively the $O_2$ valve and $H_2$ valve, enabling independent extraction of these two gases from the high pressure chamber 1.

During the first step $E^f$ (FIG. 1A), a power supply 7 connected to the cathode 3 and to the anode 4 provides a current density of 595 A/$m^2$ for 5 h, which makes it possible to deposit 3267 g of zinc on the cathode (with a Faraday efficiency of 90%).

Figure 1B:
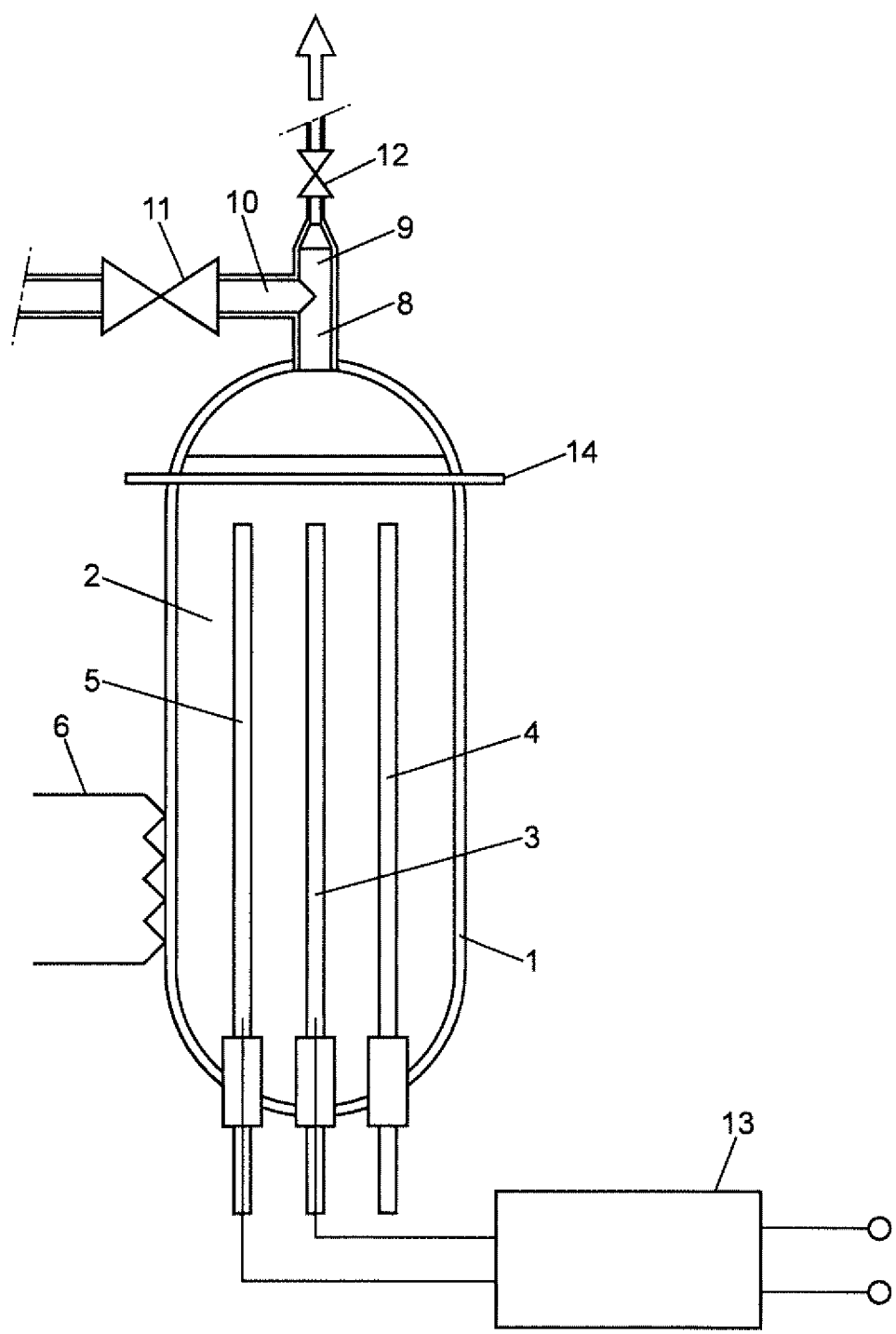
FIG. 1B is a schematic representation of the device used in the electrochemical conversion step C° of Example 1; $E^f$

The second step C° is a step of converting the electrochemical energy, stored in the form of zinc deposited on the cathode, into electricity (FIG. 1B). To do this, the cathode 3 is electrically connected to the hydrogen electrode 5 via an electronic load 13. The rate of hydrogen evolution is 350 mol/h/$m^2$ and it takes 4 hr40 to produce 50 mol of hydrogen. In the absence of a device to suppress supersaturation, the supersaturation reaches a value of approximately 6. This results in a shift in the potential of the hydrogen electrode, measured using a reference electrode, of 24 mV relative to its equilibrium value, and an achieved pressure of about 85 bar, with about 70% of the produced hydrogen trapped in dissolved form. Ultrasound is then applied by a piezoelectric generator 14 in a frequency range corresponding to the appearance of the acoustic cavitation phenomenon. The supersaturation value is returned to 1, the shift in potential of the hydrogen electrode at equilibrium to 0, and the pressure then reaches about 200 bar, with the amount of trapped hydrogen in dissolved form now only about 26%.

Example 2: With an Ion/Ion Redox Pair 1st Embodiment/Variant No. 2: F1.2

Figure 2A:
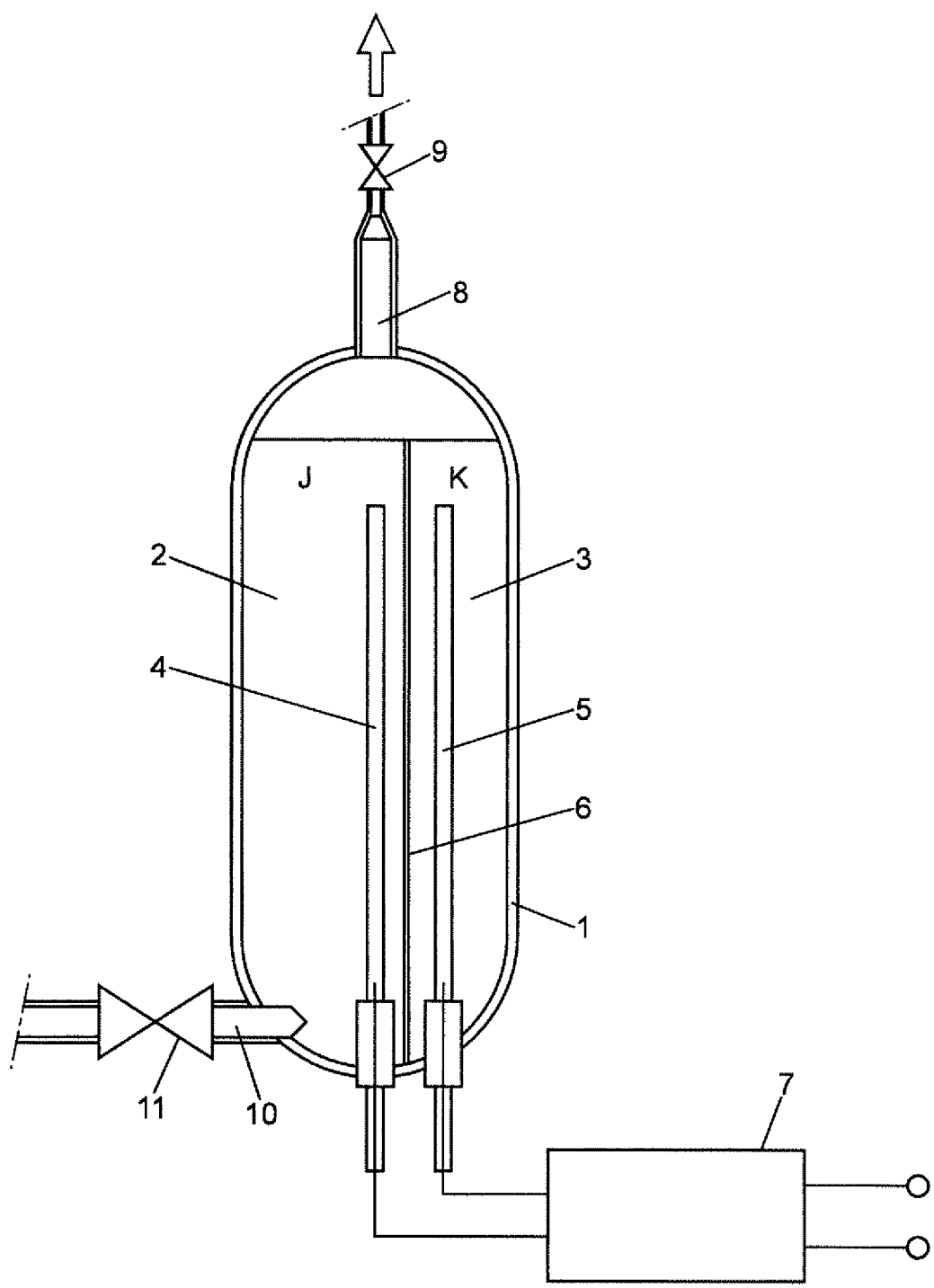
FIG. 2A is a schematic representation of the device used in the electrolysis step $E^f$ of Example 2.

In the example which follows, the device represented in FIG. 2A comprises a chamber Et which is an electrochemical cell 1 composed of two compartments (J, K) respectively containing a cathode 4 and an anode 5, each having a surface area of 150 $cm^2$, and an electrolyte (catholyte 2 and anolyte 3) of 250 mL each. The two electrolytes 2 and 3 are separated by a cationic membrane 6 made of Nafion® 125. The electrodes are made of carbon felt.

A power supply 7 is connected to the cathode 4 and anode 5.

The catholyte 2 is prepared from sodium polysulfide $Na_2S.9H_2O$ (1.6 mol·$L^{-1}$), and the anolyte 3 is a 1 mol·$L^{-1}$ sulfuric acid solution. The catholyte is prepared by mixing 96.1 g of Na2S, 9H2O (99.99%, Sigma Aldrich) and 185 g of deionized water. The anolyte is prepared by mixing 66 g of sulfuric acid (37.5%, Brenntag) in 200 mL of deionized water.

During the electrolysis step $E^f$ with oxygen production (FIG. 2A), the $S_4^{2-}$ ions are reduced to $S_2^{2-}$ at the cathode:

$$S_4^{2-}+2e^-=2S_2^{2-} E°=-0.26V$$

At the anode, the reduction of the water leads to the release of oxygen:

$$H_2O=\tfrac{1}{2}O_2+2H^++2e^- E°=1.23V$$

This oxygen is discharged via a pipe 8 equipped with a valve 9.

The power supply 7 makes it possible to apply a current of 50 mA/cm² for 2 hr20. The Faraday efficiency is 80%, and the concentration of $S_4^{2-}$ ions is 0.6 mol/L at the end of this step $E^f$.

At the end of this step, the catholyte is transferred via a pipe 10 equipped with a valve 11 to the chamber where the second step takes place.

Figure 2B:
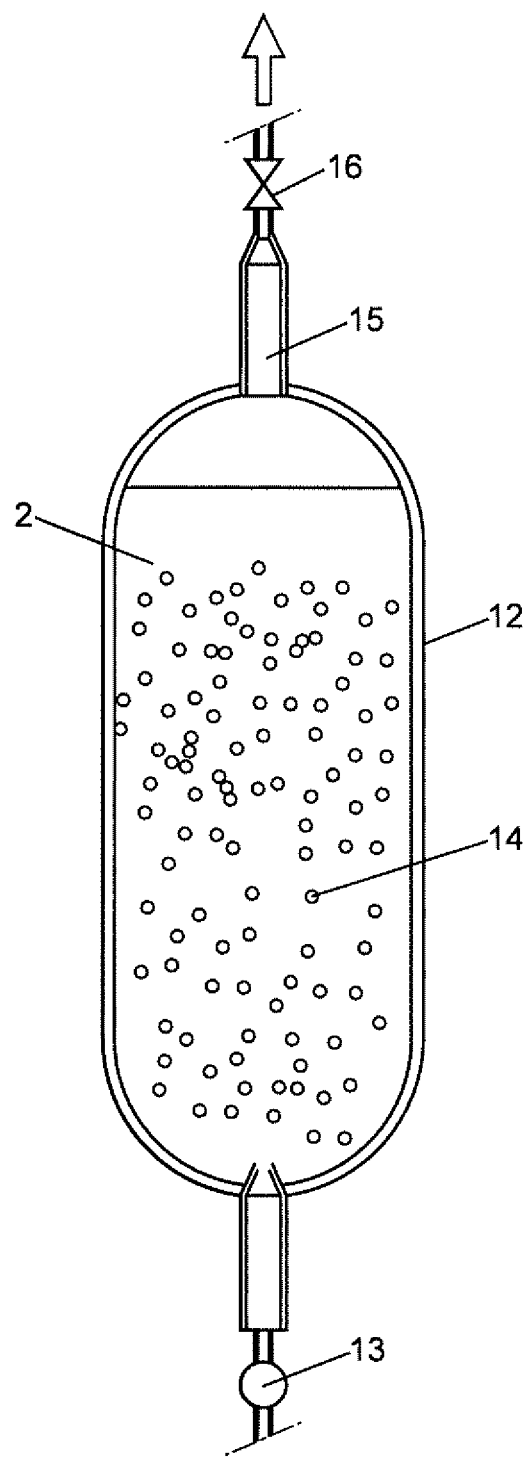
FIG. 2B is a schematic representation of the device used in the electrochemical conversion step C° of Example 2.

Step C° (FIG. 2B) allows the production of hydrogen; the catholyte 2 is sent via a pump 13 to a chemical reactor 12 containing beads 14 of tungsten carbide. Two simultaneous reactions take place:

$$2S_2^{2-}=S_4^{2-}+2e^- E°=-0.26V$$

$$2H^++2e^-=H_2 E°=0V$$

After 4 hours of electrochemical conversion catalyzed by tungsten carbide, the concentration of $S_4^{2-}$ sulfide ions is again 1.6 mol/L, and 0.25 g of $H_2$ is generated. With a supersaturation value of 6, this hydrogen can inflate a small 15 mL cartridge to about 110 bar, with a shift in potential of the hydrogen electrode of 24 mV, measured using a reference electrode. Alumina nanoparticles present in the reactor 12 enable accelerating the nucleation of gaseous hydrogen and reducing the supersaturation to 1. Desorption of the hydrogen then makes it possible to reach 250 bar in the cartridge.

Example 3: 2nd Embodiment/Variant 2 (Ion/Ion Redox Pair) F2.2

Figure 3A:
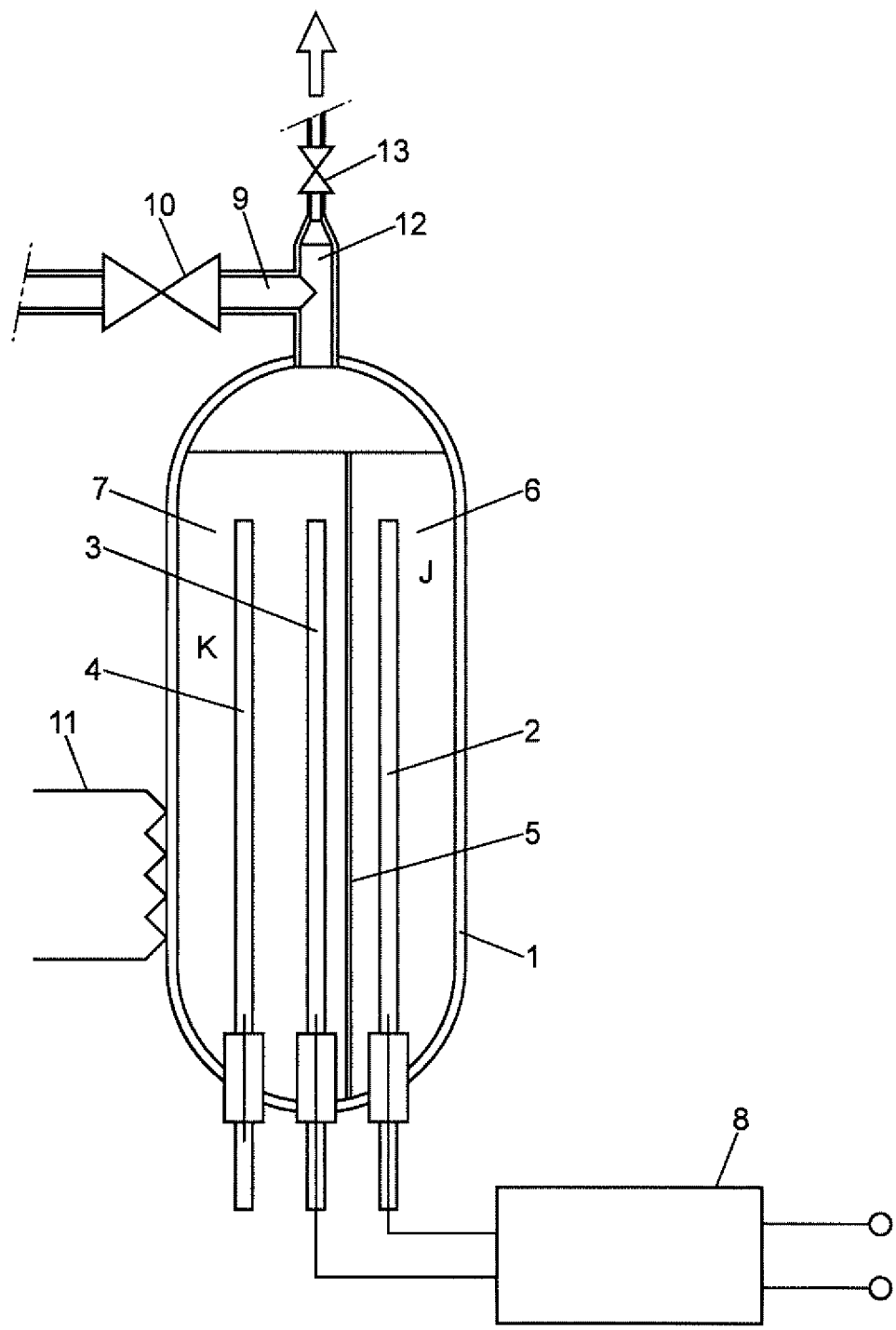
FIG. 3A is a schematic representation of the device used in the electrolysis step $E^f$ of Example 3.

In the following example, hydrogen was produced at 16 bar in the device shown in FIG. 3A. This device is a sealed electrochemical reactor/chamber 1 composed of two compartments (J, K) of 1 L each. The 1st compartment J contains a carbon electrode 2 (which acts as a cathode during the 1st electrolysis step $E^f$). The 2nd compartment K contains an electrode where oxygen is released during the 1st electrolysis step $E^f$ (anode), made of lead-silver-calcium alloy 3, and an electrode where hydrogen is released during the 2nd step C° (hydrogen electrode), made of platinum 4. The surface area of each electrode is 155 cm². A Nafion 125 5 membrane separates the electrodes of each compartment.

The electrolyte (catholyte) 6 contained in 1, blue in color, is composed of vanadium ions $VO_2^+$ (concentration 2 mol/L) and sulfuric acid ions (2 mol/L). It is prepared by mixing 520 g of sulfuric acid (37.5%, Brenntag) in 590 mL of deionized water, then adding 325 g of hydrated vanadium sulfate oxide ($OSO_4.xH_2O$; 99.9% Alfa Aesar) to this mixture.

The electrolyte (anolyte) 7 contained in the second compartment K is a 2 mol/L solution of sulfuric acid. It is prepared by mixing 520 g of sulfuric acid (37.5%, Brenntag) in 590 mL of deionized water.

During the first electrolysis step $E^f$ (FIG. 3A), a power supply 8 connected to the cathode 2 and anode 3 provides a current density of 300 A/m² for 1 h.

The following reactions occur:

at the cathode: $VO^{2+}+2H^++2e^-=V^{3+}+H_2O$ $E°=0.34V$ at the anode: $H_2O=\tfrac{1}{2}O_2+2H^++2e^-$ $E°=1.23V$ The oxygen is discharged through pipe 9, controlled by valve 10.

Figure 3B:
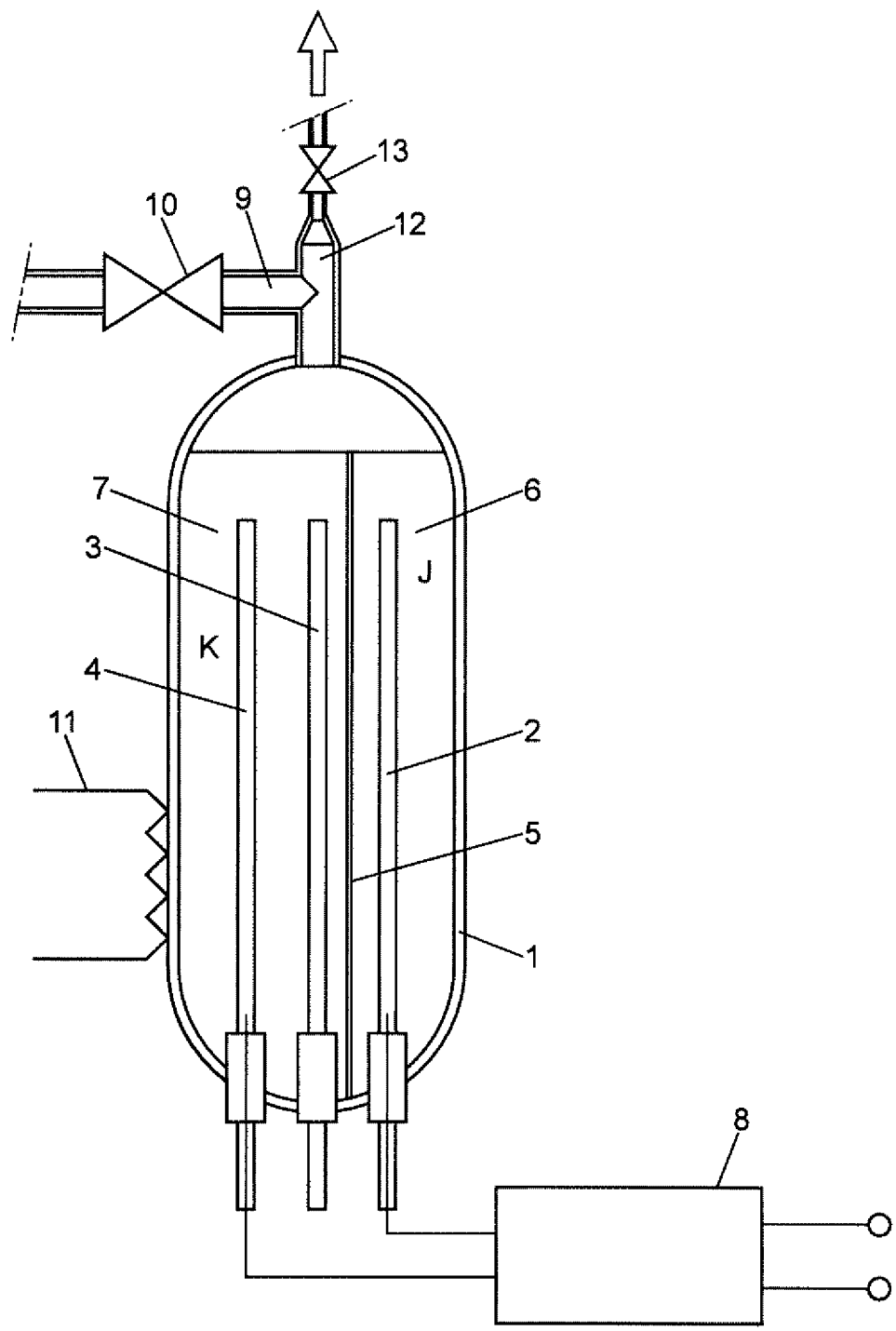
FIG. 3B is a schematic representation of the device used in the electrochemical conversion step C° of Example 3.

During the 2nd electrochemical conversion step C° (FIG. 3B), the cathode 2 (which then acts as an anode) and the $H_2$ electrode 4 are connected to the power supply 8 which supplies 300 A/m² for 1 hour. 1.2 g of hydrogen at 16 bar are produced.

The following reactions take place:

At the $H_2$ electrode 4: $2H^++2e^-=H_2$ $E°=0V$

At electrode 2: $V^{3+}+H_2O=VO^{2+}+2H^++2e^-$ $E°=0.34V$

The hydrogen released alone then rises under pressure as the electrolysis proceeds. Localized heating 11 allows the temperature of the electrolyte to be increased in a localized manner, which results in desupersaturation of the electrolyte. The gaseous hydrogen formed is evacuated through pipe 12 controlled by valve 13 when the target pressure (16 bar) is reached.

The invention claimed is:

1. An electrochemical process for the production of pressurized gaseous hydrogen, characterized in that it consists essentially of implementing, in a decoupled manner, at least one step $E'$ of electrolysis of an electrolyte, this electrolysis step $E'$ producing gaseous oxygen in a chamber $E'$, and at least one step C° of electrochemical conversion of $H^+$ ions into gaseous hydrogen in a chamber C° which is identical to or different from chamber $E'$ and which contains a liquid phase L and a gas phase G not dissolved in this liquid phase; wherein:

when chamber $E'$ and C° are identical, decoupled steps $E'$ and C° are performed in a chamber $E'$ C°;

the chamber C° and/or $E'$ C° comprises at least one electrode;

the electrolysis step $E'$ involves at least one cathode on which at least one ionic species is electrochemically reduced;

the gaseous hydrogen produced in the conversion step C.° is partly present in the gaseous headspace of chamber C°, as bubbles in the electrolyte; and partly dissolved in the electrolyte which is thus supersaturated; with hydrogen;

the electrolyte comprises at least one redox pair (A/B) forming at least one intermediate vector enabling the decoupling of steps $E'$ & C°, acidic electrolyte:

$$E_{th}(A/B) < E_{th}(O_2/H_2O);$$

$$|\Delta[E_{th}(A/B)-E_{th}(O_2/H_2O)] \geq 100\ mV$$

basic electrolyte:

$$E_{th}(A/B) < E_{th}(O_2/H_2O);$$

$$|\Delta[E_{th}(A/B)-E_{th}(O_2/H_2O)] \geq 100\ mV$$

the interface between the undissolved gas phase G and the liquid phase L—hereinafter referred to as the G/L interface—is increased at least during step C°, so as to accelerate the diffusion, from the liquid phase to the gas phase, of the dissolved hydrogen able to supersaturate the electrolyte;

and the pressurized gaseous hydrogen is collected in a storage tank.

2. The process according to claim 1, wherein the electrolyte is an aqueous electrolyte.

3. The process according to claim 1, wherein the increase of the G/L interface is carried out by implementing at least one of the following operations:

(i) forced circulation, which comprises generating an electrolyte flow in a chamber $E'\, C°$ or $C°$;

(ii) at least partial substitution of the dissolved hydrogen by at least one neutral gas, by injection of the latter into chamber $E'\, C°$ or $C°$ to generate bubbles of neutral gas intended to evacuate and replenish the gas bubbles present on the electrode or electrodes, on any catalyst(s) not dissolved in the electrolyte, and/or on any roughnesses of chamber $E'\, C°$ or $C°$;

(iii) partial decompression, which consists of isolating the storage tank from chamber $E'\, C°$ or $C°$, in order to increase the pressure of gaseous hydrogen in the chamber; then when this pressure is greater than that in the storage tank, a decompression of chamber $E'\, C°$ or $C°$ is performed, which creates or increases the supersaturation of $H_2$ in the electrolyte and therefore promotes the formation of bubbles;

(iv) spraying the electrolyte as droplets into the gaseous headspace of chamber $E'\, C°$ or $C°$, (v) at least one localized heating, of the electrolyte, which consists of locally reducing the solubility of the dissolved gaseous hydrogen, thus promoting the nucleation of bubbles, (vi) subjecting the electrolyte to ultrasound to generate bubbles, (vii) at least one localized depolarization of the electrolyte, (viii) making use of nanoparticles and/or at least one porous nucleation material in the electrolyte, to promote the nucleation of bubbles and increase the number of bubbles nucleation sites, (ix) mechanical stirring of the electrolyte, which promotes the nucleation of bubbles by providing the energy necessary to counteract the surface tension.

4. The process according to claim 3, wherein in the step (i) of the increase of the G/L interface is carried out by implementing a forced circulation using at least one pump, so as to evacuate and replenish the gas bubbles present on the electrode or electrodes or a catalyst(s) and on any roughnesses of chamber $E'\, C°$ or $C°$.

5. The process according to claim 3, wherein in the step (vii) of the increase of the G/L interface is carried out by implementing at least one localized depolarization of the electrolyte which consists of accelerating the kinetics of the hydrogen formation reaction in order to locally increase supersaturation and promote the formation of bubbles.

6. The process according to 1, wherein, according to a first embodiment F1 including an electrolysis step $E'$ and a step $C.°$ of electrochemical conversion which is a step of operating as a battery:

with an acidic electrolyte:

$E_{th}(A/B) < E_{th}(O_2/H_2O)$;

$|\Delta[E_{th}(A/B) - E_{th}(O_2/H_2O)]| \geq 100\ mV$ with a basic electrolyte:

$E_{th}(A/B) < E_{th}(O_2/H_2O)$;

$|\Delta[E_{th}(A/B) - E_{th}(O_2/H_2O)]| \geq 100\ mV$.

7. The process according to claim 6, characterized by a redox pair (A/B) wherein:
A is composed of at least one metal ion of metal M;
B is composed of at least metal M.

8. The process according to claim 7, wherein the metal M is selected from the group consisting of Zn, Cd, Sn, Ni, Mn, Fe, Pb, and Co.

9. The process according to claim 8, wherein the metal M is Zn.

10. The process according to claim 6, characterized by a redox pair (A/B) wherein:
A is composed of at least one ion $I^A$ whose number of valence electrons is V1;
B is composed of at least one ion $I^B$ whose number of valence electrons $V2 < V1$.

11. The process according to claim 10, wherein I is chosen from the ions resulting from atoms selected from the group consisting of Fe, U, Cr, S, and V.

12. The process according to claim 11, wherein I is iron or vanadium.

13. Process according to claim 7, wherein:

M(i). the electrolysis step $E'$ and the conversion step $C.°$ are carried out in a same chamber $E'\, C°$ containing electrolyte in which are immersed at least three electrodes, namely at least one cathode on which the reduced metal M is deposited during the electrolysis step $E'$, at least one anode in the vicinity of which is produced gaseous oxygen resulting from the oxidation of water during the electrolysis step $E'$, and at least one hydrogen electrode inactive during the electrolysis step $E'$ in the vicinity of which is produced the gaseous hydrogen resulting from reduction of the $H^+$ ions of the electrolyte during the conversion step $C°$;

M(ii). during the electrolysis step $E'$, a power supply connected to the cathode and to the anode delivers an electric current, such that the metal M is deposited on the cathode and gaseous oxygen is released at the anode;

M(iii). for the implementation of the conversion step $C°$:
the chamber $E'\, C°$ is hermetically sealed;
the cathode of step $E'$, which becomes the anode of step $C°$, is connected to the hydrogen electrode by an electrical conductor so as to function as a battery being discharged, such that the metal M is dissolved in the electrolyte at the anode of $C°$ and gaseous hydrogen is released and compressed in the gaseous headspace of the sealed chamber $E'\, C°$; and
means for increasing the G/L interface are put into operation to promote the transformation of the dissolved gas in the electrolyte, into undissolved gas.

14. A process according to claim 13, wherein the dissolved gas in the electrolyte which is transformed into undissolved gas as the means for increasing the G/L interface are put into operation, is hydrogen.

15. The process according to claim 1, according to a second embodiment F2 including an electrolysis step $E'$ and a step $C.°$ of electrochemical conversion which is an electrolysis step wherein:

with an acidic electrolyte:

$E_{th}(A/B) < E_{th}(O_2/H_2O)$;

$|\Delta[E_{th}(A/B) - E_{th}(O_2/H_2O)]| \geq 100$ mV

With a basic electrolyte:

$E_{th}(A/B) < E_{th}(O_2/H_2O)$;

$|\Delta[E_{th}(A/B) - E_{th}(O_2/H_2O)]| \geq 100$ mV.

16. The process according to claim 15, characterized by a redox pair (A/B) wherein:
   A is composed of at least one metal ion of metal M;
   B is composed of at least metal M.

17. Process according to claim 16 characterized by a redox pair (A/B) wherein M is selected from the group comprising Cu, Mn, and Ag.

18. The process according to claim 17 characterized by a redox pair (A/B) wherein M is Cu.

19. The process according to claim 15 characterized by a redox pair (A/B) wherein:
   A is composed of at least one ion IA whose number of valence electrons is V1;
   B is composed of at least one ion IB whose number of valence electrons V2<V1.

20. The process according to claim 19 characterized by a redox pair (A/B) wherein I is chosen from the ions resulting from the atoms selected from the group consisting of chosen Fe, V, Mn, iron, and vanadium.

21. The process according to claim 19 characterized by a redox pair (A/B) wherein I is iron or vanadium.

22. The process according to claim 16, wherein
   the electrolysis step $E'$ and the conversion step $C.°$ are carried out in one and the same chamber $E' C°$;
   the chamber $E' C°$ comprises:
   at least one electrochemical compartment (J) containing an electrolyte including the redox pair (A/B),
   and at least one electrochemical compartment (K) containing an electrolyte in which at least one hydrogen electrode is immersed,
   these two electrochemical compartments being separated by at least one ion-exchange membrane;
   at least one anode;
   at least one cathode;
   during the electrolysis step $E'$, a power supply connected to the cathode and to the anode delivers an electric current, such that the A ions are reduced to B at the cathode and such that the oxidation of the water leads to a release of gaseous oxygen at the anode;
   for the implementation of the conversion step $C°$:
   the chamber $E' C°$ is hermetically sealed,
   the cathode of step $E'$, which becomes the anode of step $C°$, is connected to the hydrogen electrode by a power supply which delivers an electric current so that the reducing agents B are oxidized to ions A in compartment (J) concurrently with a reduction of the $H^+$ ions contained in compartment (K) to gaseous hydrogen, which is released and compressed in the gaseous headspace of the sealed chamber $E' C°$,
   and means for increasing the G/L interface are put into operation to promote the transformation of dissolved gas in the electrolyte into undissolved gas.

23. The process according to claim 22, wherein the dissolved gas in the electrolyte which is transformed into undissolved gas as the means for increasing the G/L interface are put into operation, is hydrogen.

24. A process according to 3, wherein, according to a first embodiment F1 including an electrolysis step $E'$ and a step $C.°$ of electrochemical conversion which is a step of operating as a battery:
   with an acidic electrolyte:

$E_{th}(A/B) < E_{th}(O_2/H_2O)$;

$|\Delta[E_{th}(A/B) - E_{th}(O_2/H_2O)]| \geq 100$ mV with a basic electrolyte:

$E_{th}(A/B) < E_{th}(O_2/H_2O)$;

$|\Delta[E_{th}(A/B) - E_{th}(O_2/H_2O)]| \geq 100$ mV.

25. The process according to claim 3, according to a second embodiment F2 including an electrolysis step $E'$ and a step $C.°$ of electrochemical conversion which is an electrolysis step wherein:

With an acidic electrolyte:

$E_{th}(A/B) < E_{th}(O_2/H_2O)$;

$|\Delta[E_{th}(A/B) - E_{th}(O_2/H_2O)]| \geq 100$ mV

With a basic electrolyte:

$E_{th}(A/B) < E_{th}(O_2/H_2O)$;

$|\Delta[E_{th}(A/B) - E_{th}(O_2/H_2O)]| \geq 100$ mV.

26. The process according to claim 19, wherein
   the electrolysis step $E'$ and the conversion step $C.°$ are carried out in one and the same chamber $E' C°$;
   the chamber $E' C°$ comprises:
   at least one electrochemical compartment (J) containing an electrolyte including the redox pair (A/B),
   and at least one electrochemical compartment (K) containing an electrolyte in which at least one hydrogen electrode is immersed,
   these two electrochemical compartments being separated by at least one ion-exchange membrane;
   at least one anode;
   at least one cathode;
   during the electrolysis step $E'$, a power supply connected to the cathode and to the anode delivers an electric current, such that the A ions are reduced to B at the cathode and such that the oxidation of the water leads to a release of gaseous oxygen at the anode;
   for the implementation of the conversion step $C°$:
   the chamber $E' C°$ is hermetically sealed,
   the cathode of step $E'$, which becomes the anode of step $C°$, is connected to the hydrogen electrode by a power supply which delivers an electric current so that the reducing agents B are oxidized to ions A in compartment (J) concurrently with a reduction of the $H^+$ ions contained in compartment (K) to gaseous hydrogen, which is released and compressed in the gaseous headspace of the sealed chamber $E' C°$, and means for increasing the G/L interface are put into operation to promote the transformation of dissolved gas in the electrolyte into undissolved gas.

\* \* \* \* \*